United States Patent
Kawauchi et al.

(10) Patent No.: US 8,249,180 B2
(45) Date of Patent: Aug. 21, 2012

(54) RECEIVING APPARATUS, RECEIVING METHOD, AND PROGRAM

(75) Inventors: Hidetoshi Kawauchi, Kanagawa (JP); Tomoharu Honda, Tokyo (JP)

(73) Assignee: Sony Corporation, Tokyo (JP)

( * ) Notice: Subject to any disclaimer, the term of this patent is extended or adjusted under 35 U.S.C. 154(b) by 206 days.

(21) Appl. No.: 12/749,644

(22) Filed: Mar. 30, 2010

(65) Prior Publication Data

US 2010/0254475 A1 Oct. 7, 2010

(30) Foreign Application Priority Data

Apr. 6, 2009 (JP) ................................ P2009-091963

(51) Int. Cl.
*H04L 27/28* (2006.01)
*H04K 1/10* (2006.01)

(52) U.S. Cl. ......... 375/260; 375/316; 375/324; 375/340

(58) Field of Classification Search .................. 375/260, 375/316, 340, 324
See application file for complete search history.

(56) References Cited

U.S. PATENT DOCUMENTS

| 7,447,163 | B1 * | 11/2008 | Thomson et al. | 370/252 |
| 2006/0098751 | A1 * | 5/2006 | Zhang et al. | 375/260 |
| 2008/0225961 | A1 | 9/2008 | Jeong | |

* cited by examiner

*Primary Examiner* — Ted Wang
(74) *Attorney, Agent, or Firm* — Frommer Lawrence & Haug LLP; William S. Frommer

(57) ABSTRACT

A receiving apparatus is disclosed which includes a reception device configured to receive a signal modulated through Orthogonal Frequency Division Multiplexing known as OFDM; and a detection device configured to detect whether or not spectrum inversion has occurred in the OFDM-modulated signal by use of a spectrum inversion presence signal obtained by inverting a subcarrier position of a known signal included in the OFDM-modulated signal.

7 Claims, 11 Drawing Sheets

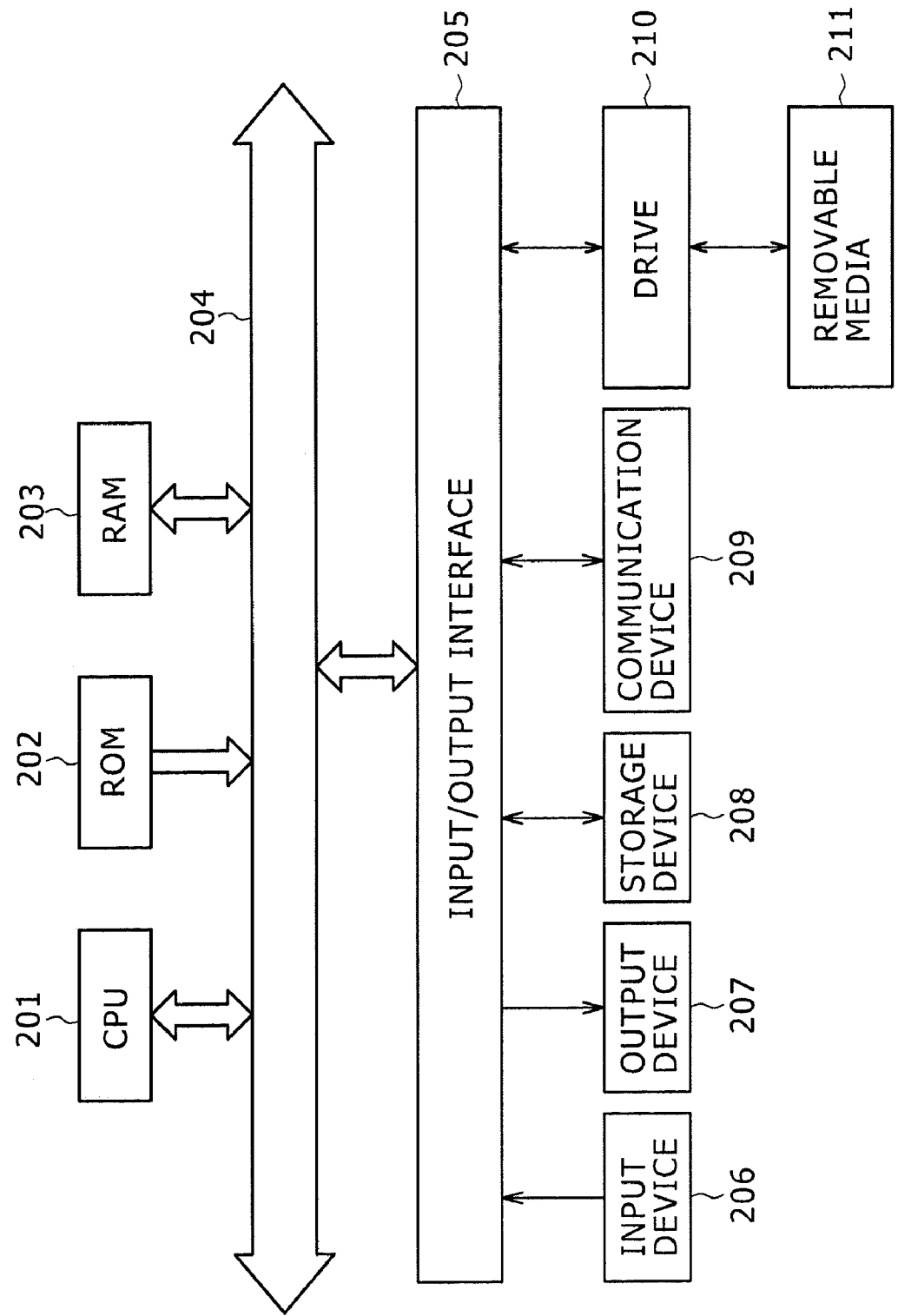

US 8,249,180 B2

RECEIVING APPARATUS, RECEIVING METHOD, AND PROGRAM

BACKGROUND OF THE INVENTION

1. Field of the Invention

The present invention relates to a receiving apparatus, a receiving method, and a program. More particularly, the invention relates to a receiving apparatus, a receiving method, and a program for detecting whether spectrum inversion has occurred in OFDM-modulated signals.

2. Description of the Related Art

Terrestrial digital broadcasts based on such standards as DVB-T (Digital Video Broadcasting-Terrestrial) or ISDB-T (Integrated Services Digital Broadcasting-Terrestrial) utilize the modulation method known as Orthogonal Frequency Division Multiplexing, abbreviated to OFDM in the ensuing description.

OFDM is a method which, when numerous orthogonal subcarriers are provided on the transmission bandwidth, assigns data to the amplitude and phase of each of the subcarriers for digital modulation through PSK (Phase Shift Keying) or QAM (Quadrature Amplitude Modulation).

SUMMARY OF THE INVENTION

In an apparatus designed to receive OFDM-modulated signals, spectrum inversion can take place upon conversion of an RF (radio frequency) signal to an IF (intermediate frequency) signal. In such a case, the OFDM-modulated signal cannot be demodulated accurately.

The present invention has been made in view of the above circumstances and provides a receiving apparatus, a receiving method, and a program capable of detecting whether spectrum inversion has occurred in OFDM-modulated signals.

In carrying out the present invention and according to one embodiment thereof, there is provided a receiving apparatus including: a reception device configured to receive a signal modulated through Orthogonal Frequency Division Multiplexing known as OFDM; and a detection device configured to detect whether or not spectrum inversion has occurred in the OFDM-modulated signal using a spectrum inversion presence signal obtained by inverting a subcarrier position of a known signal included in the OFDM-modulated signal.

According to other embodiments of the present invention, there is provided a receiving method for use with the above-outlined receiving apparatus, as well as a program for causing a computer to execute a process equivalent to the inventive receiving method.

According to the present invention embodied as outlined above, a known signal included in the received OFDM-modulated signal is detected so as to detect whether or not spectrum inversion has occurred in the OFDM-modulated signal, through the use of a spectrum inversion presence signal obtained by inverting a subcarrier position of the known signal.

The present invention embodied as outlined above thus provides arrangements making it possible to detect whether or not spectrum inversion has occurred in OFDM-modulated signals.

BRIEF DESCRIPTION OF THE DRAWINGS

FIG. 11 is a block diagram showing a typical structure of a personal computer.

DETAILED DESCRIPTION OF THE PREFERRED EMBODIMENTS

Premise for the Invention

The premise for the present invention will be first explained below in reference to FIGS. 1 through 4.

[Explanation of the OFDM-Modulated Signal]

Figure 1:
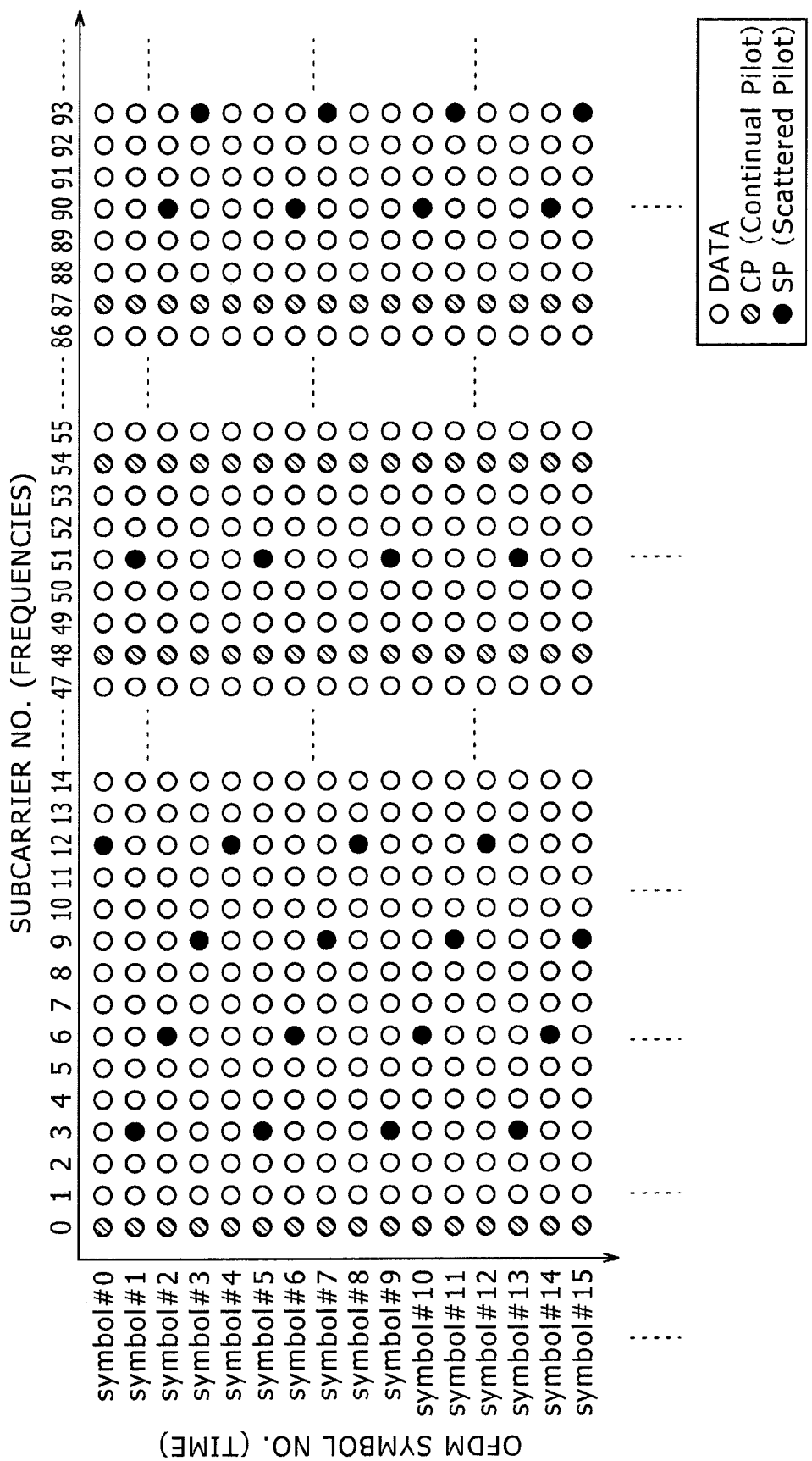
FIG. 1 is a schematic view showing a typical OFDM signal constellation according to the DVB-T standard.

FIG. 1 is a schematic view showing a typical OFDM signal constellation according to the DVB-T standard. In FIG. 1, the vertical direction stands for time and the horizontal direction for frequencies.

As shown in FIG. 1, the DVB-T-based OFDM signal is made up of a data signal, pilot signals for synchronization and equalization, and TPS (Transmission Parameters Signaling) signals (not shown).

There are two kinds of pilot signals: a CP (continual pilot) signal inserted per symbol, and an SP (scattered pilot) signal inserted at predetermined time intervals. The pilot signal is a known signal modulated through BPSK (Binary Phase Shift Keying). The same pilot signal is transmitted on the same carrier.

[Typical Structure of the OFDM Receiving Apparatus]

Figure 2:
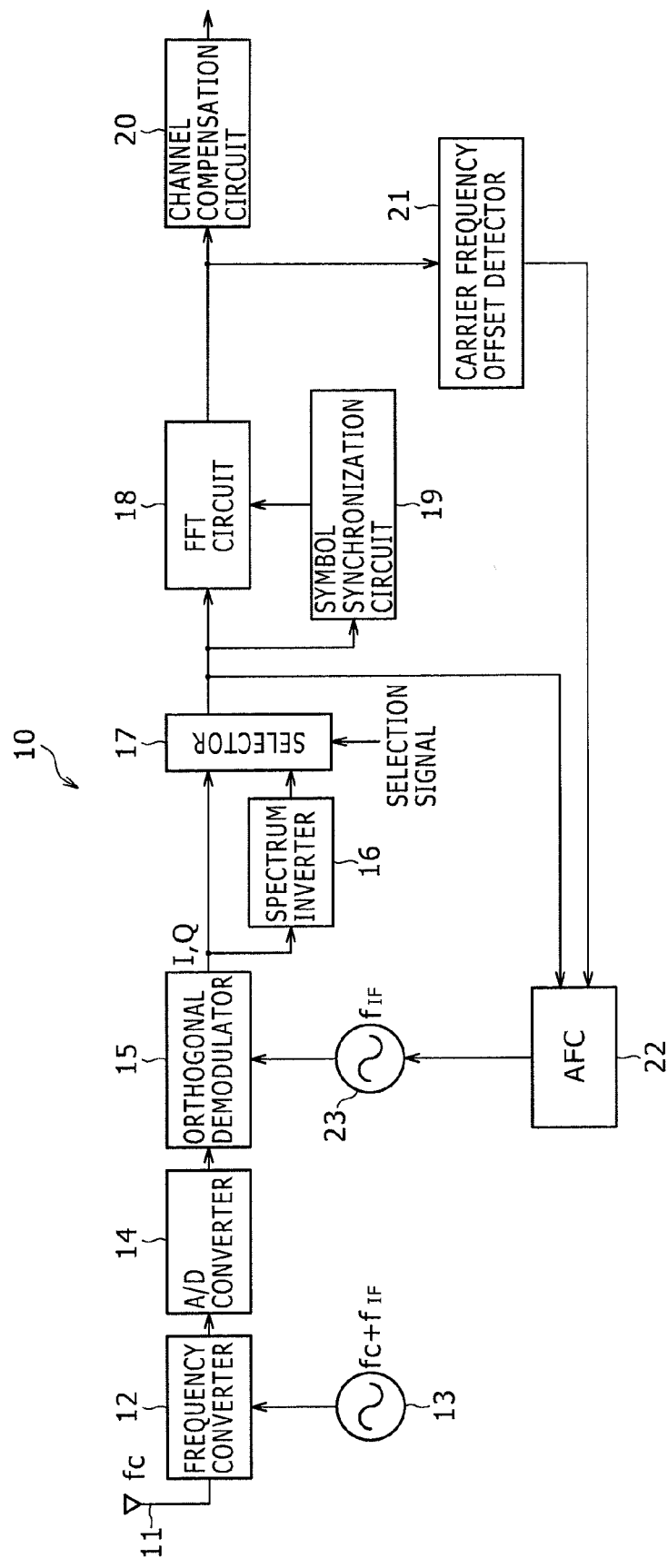
FIG. 2 is a block diagram showing a typical structure of an OFDM receiving apparatus presented as the premise for the present invention.

FIG. 2 is a block diagram showing a typical structure of an OFDM receiving apparatus 10 presented as the premise for the present invention.

The OFDM receiving apparatus 10 includes an antenna 11, a frequency converter 12, a local oscillator 13, an A/D converter 14, an orthogonal demodulator 15, a spectrum inverter 16, a selector 17, an FFT circuit 18, and a symbol synchronization circuit 19. The OFDM receiving apparatus 10 also contains a channel compensation circuit 20, a carrier frequency offset detector 21, a carrier synchronization circuit (AFC) 22, and a local oscillator 23.

The antenna 11 receives an RF signal and feeds the received signal to the frequency converter 12. The frequency converter 12 multiplies the RF signal fed from the antenna 11 by a carrier having an oscillatory frequency of $(f_C + f_{IF})$ fed from the local oscillator 13 so as to frequency-convert the RF signal into an IF signal having a center frequency $f_{IF}$. The frequency converter 12 sends this IF signal to the A/D converter 14. The local oscillator 13 generates a carrier having the oscillatory frequency ($F_C+F_{IF}$), and feeds the generated carrier to the frequency converter 12.

The A/D converter 14 subjects to A/D conversion the IF signal supplied from the frequency converter 12, and sends the resulting IF signal in digital form to the orthogonal demodulator 15. Given the IF signal from the A/D converter 14, the orthogonal demodulator 15 orthogonally demodulates the received IF signal using the carrier supplied from the local oscillator 23. The orthogonal demodulator 15 supplies the spectrum inverter 16 and selector 17 with an I signal and a Q signal acquired through orthogonal demodulation.

The spectrum inverter 16 performs a spectrum inversion process on the I signal and Q signal coming from the orthogonal demodulator 15. The spectrum inversion process includes switching the I signal with the Q signal, and multiplying the Q signal alone by "−1." The spectrum inverter 16 supplies the selector 17 with the I signal and Q signal having undergone the spectrum inversion process.

In accordance with an externally supplied selection signal, the selector 17 selects either the I signal and Q signal coming from the orthogonal demodulator 15 or the I signal and Q signal from the spectrum inverter 16, and outputs the selected signals to the FFT circuit 18, symbol synchronization circuit 19, and AFC 22. The selection signal is predetermined illustratively on the basis of the combination of the frequency of the RF signal targeted to be processed, the oscillatory frequency ($f_c+f_{IF}$) of the local oscillator 23, and the sampling frequency of the A/D converter 14.

In accordance with a symbol synchronization signal fed from the symbol synchronization circuit 19, the FFT circuit 18 performs FFT computation on the I signal and Q signal supplied from the selector 17. The FFT circuit 18 supplies the channel compensation circuit 20 and carrier frequency offset detector 21 with the OFDM signal composed of the I signal and Q signal which are obtained through FFT computation and which represent the orthogonally modulated data of each subcarrier.

Using the I signal and Q signal fed from the selector 17, the symbol synchronization circuit 19 detects the correlation value of a guard interval (GI) using the I signal and Q signal supplied from the selector 17. On the basis of the correlation value thus detected, the symbol synchronization circuit 19 generates a symbol synchronization signal and sends the generated signal to the FFT circuit 18.

The channel compensation circuit 20 equalizes the OFDM signal fed from the FFT circuit 18, and outputs the equalized OFDM signal as the result of compensation.

The carrier frequency offset detector 21 detects an offset amount of each subcarrier using the OFDM signal supplied from the FFT circuit 18. The carrier frequency offset detector 21 proceeds to feed back the subcarrier-by-subcarrier offset amounts to the AFC 22.

The offset amount is an amount by which the frequency of each subcarrier in the OFDM signal actually output from the FFT circuit 28 differs from the frequency of each subcarrier in the normal OFDM signal. The carrier frequency offset detector 21 will be explained later in more detail by referring to FIG. 3.

The AFC 22 detects the correlation value of the GI using the I signal and Q signal fed from the selector 17, and controls the local oscillator 23 based on the detected correlation value in such a manner as to remove offsets smaller than the subcarriers of the carrier generated the local oscillator 23. The AFC 22 also controls the local oscillator 23 based on the subcarrier-by-subcarrier offset amounts fed from the carrier frequency offset detector 21 so as to remove offsets larger than the subcarriers of the carrier generated by the local oscillator 23.

Under control of the AFC 22, the local oscillator 23 generates the carrier of a predetermined frequency and feeds the generated carrier to the orthogonal demodulator 15.

[Typical Detailed Structure of the Carrier Frequency Offset Detector]

Figure 3:
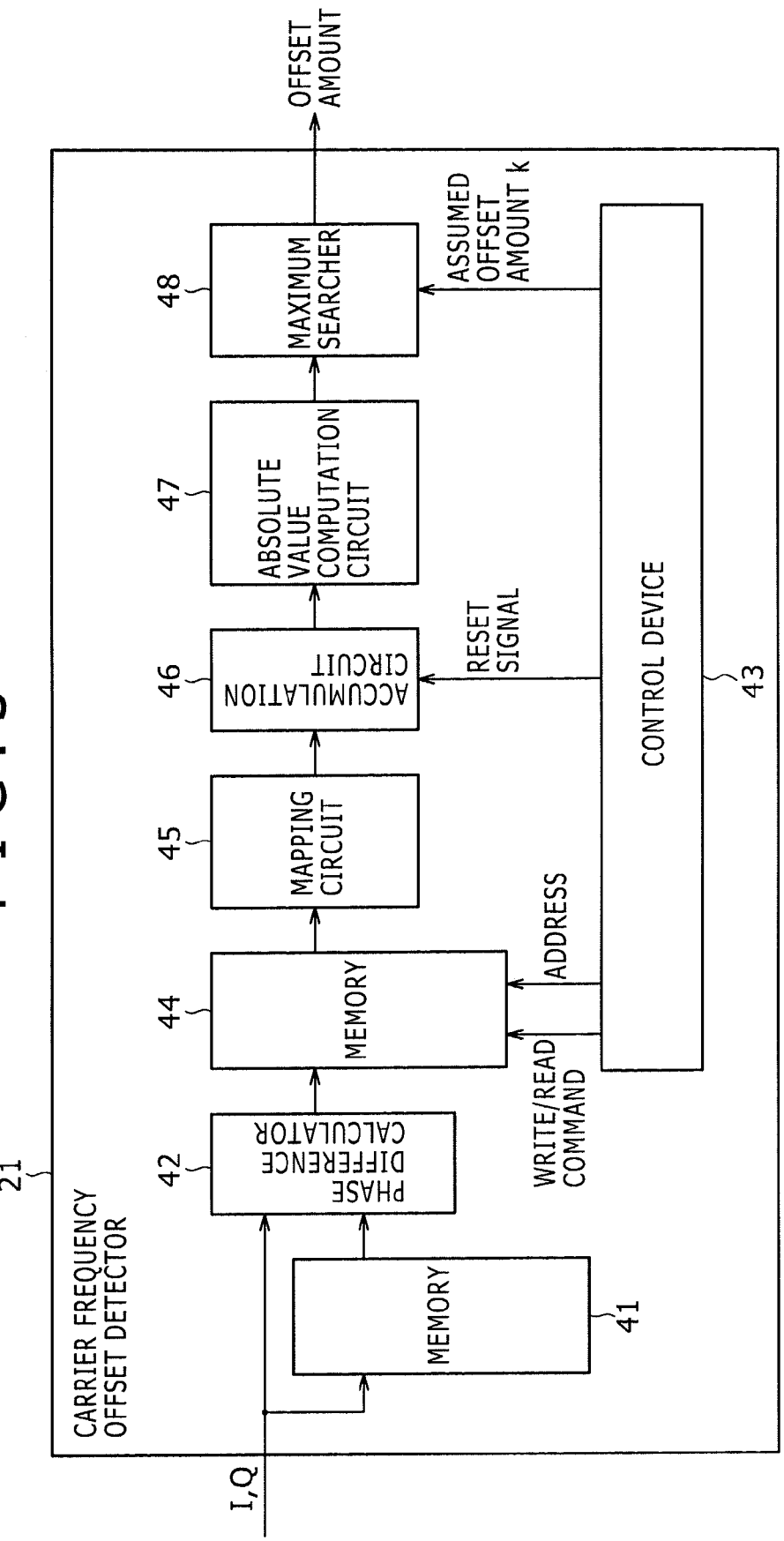
FIG. 3 is a block diagram showing a typical detailed structure of a carrier frequency offset detector included in FIG. 2.

FIG. 3 is a block diagram showing a typical detailed structure of the carrier frequency offset detector 21 included in FIG. 2.

The carrier frequency offset detector 21 in FIG. 3 is made up of a memory 41, a phase difference calculator 42, a control device 43, a memory 44, a mapping circuit 45, an accumulation circuit 46, an absolute value computation circuit 47, and a maximum searcher 48.

The memory 41 and phase difference calculator 42 calculate the phase difference between two consecutive symbols per subcarrier.

Specifically, the memory 41 stores an I signal and a Q signal which constitute the OFDM signal for one symbol and which are supplied from the FFT circuit 18. The phase difference calculator 42 calculates the phase difference per subcarrier using the OFDM signal for the current symbol fed from the FFT circuit 18 and the OFDM signal for the immediately preceding symbol stored in the memory 41.

Since the CP signal is the same for all symbols, the phase differences of the subcarriers each having the CP signal placed thereon should be theoretically zero. In practice, however, the phase differences are close to but not the same as zero due to noise and other factors. On the other hand, the data signal of each symbol may or may not be the same. It follows that the phase differences of the subcarriers each having a data signal placed thereon take on random values of which the average is zero.

The phase difference calculator 42 sends the calculated phase differences of all subcarriers to the memory 44 for storage.

The control device 43, memory 44, mapping circuit 45, accumulation circuit 46, absolute value computation circuit 47, and maximum searcher 48 work together to detect the offset amount per subcarrier through correlation processing using the phase differences of the subcarriers detected by the phase difference calculator 42.

Specifically, the control device 43 successively sets to an assumed offset amount "k" the offset amount of each of the subcarriers within a predetermined offset amount detection range. The control device 43 feeds that assumed offset amount "k" to the maximum searcher 48. The control device 43 also determines a read address based on the assumed offset amount "k" and on a set of the subcarrier numbers of the subcarriers on which is placed the CP signal defined by a predetermined standard (the subcarriers will be called the known CP subcarriers hereunder).

More specifically, the subcarrier number obtained by shifting the subcarrier numbers of the known CP subcarriers by the assumed offset amount "k" constitutes the subcarrier number of the subcarrier on which the CP signal is placed when the actual offset amount per subcarrier is the assumed offset amount "k" (the subcarrier will be called the assumed CP subcarrier hereunder).

Thus the control device 43 acquires the address in the memory 44 at which is stored the phase difference of the assumed CP subcarrier based on the subcarrier number of the assumed CP subcarrier obtained by shifting by the assumed offset amount "k" the subcarrier numbers of the known CP subcarriers within the set of interest. The control device 43 determines the address thus acquired as the read address. The control device 43 proceeds to supply the memory 44 with the read address thus determined as well as a read command.

Also, every time the accumulation circuit 46 completes the accumulation of the phase differences of the assumed CP subcarrier per symbol, the control device 43 feeds a reset signal to the accumulation circuit 46. The control device 43 further supplies a write command and a write address to the memory 44.

Based on the write command and write address coming from the control device 43, the memory 44 stores the phase differences of all subcarriers fed from the phase difference calculator 42. On the basis of the read command and the read address from the control device 43, the memory 44 reads the phase difference of the assumed CP subcarrier and feeds it to the mapping circuit 45.

The mapping circuit 45 maps the phase difference of the assumed CP subcarrier read from the memory 44 onto a circumference with a fixed radius on a complex plane for conversion into a vector. The mapping circuit 45 supplies the vector thus obtained to the accumulation circuit 46.

The accumulation circuit 46 has an internal memory, not shown. The accumulation circuit 46 adds the vector from the mapping circuit 45 and a vector previously held in the memory to obtain a new vector until a reset signal is fed from the control device 43. The accumulation circuit 46 places the vector thus obtained into its internal memory, and the process is repeated. The repeated process accumulates the vectors of each symbol, and the accumulated result is held in the memory.

In response to the reset signal coming from the control device 43, the accumulation circuit 46 supplies the absolute value computation circuit 47 with the accumulated result of the vectors for one symbol held in the internal memory, before resetting the memory.

The absolute value computation circuit 47 computes the absolute value of the vector fed from the accumulation circuit 46. The absolute value computation circuit 47 then sends the absolute value to the maximum searcher 48 as a correlation value.

The maximum searcher 48 retains a table that associates the correlation values fed from the absolute value computation circuit 47 with the assumed offset value "k" from the control device 43. The maximum searcher 48 supplies the assumed offset value "k" corresponding to the maximum correlation value written in the table regarding each symbol, to the AFC 22 as the offset amount per subcarrier.

If the actual offset amount per subcarrier is the assumed offset value "k," the correlation value tends to be large because it is the absolute value of the accumulated result of the vectors representative of the phase difference of the CP signal. On the other hand, if the actual offset amount per subcarrier is not the assumed offset value "k," the correlation value tends to be small because the correlation value is the absolute value of the accumulated result of the vectors representative of the phase difference of the data signal, with the vector values canceling out one another when accumulated.

As a result, the maximum searcher 48 can supply the AFC 22 with the actual offset amount per subcarrier when feeding the assumed offset amount "k" corresponding to the maximum correlation value to the AFC 22.

[Explanation of how to Detect the Offset Amount Per Subcarrier]

Figure 4:
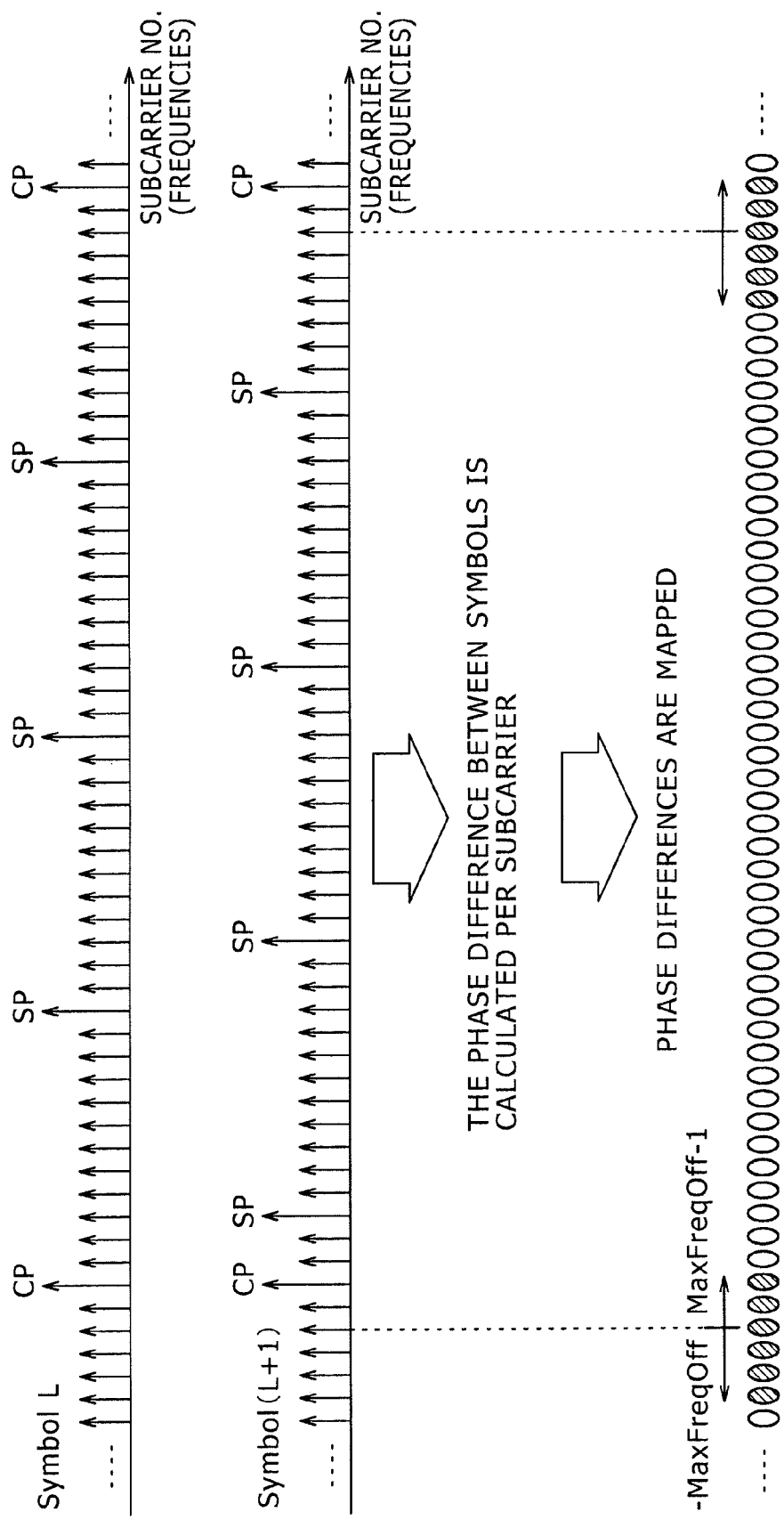
FIG. 4 is a schematic view explanatory of how to detect an offset amount of each subcarrier.

FIG. 4 is a schematic view explanatory of how the carrier frequency offset detector 21 of FIG. 3 detects the offset amount of each subcarrier.

In the example of FIG. 4, the actual offset amount per subcarrier is 2. Also in FIG. 4, a deviation to the left is represented by a negative offset amount and a deviation to the right is denoted by a positive offset amount.

As shown in FIG. 4, the carrier frequency offset detector 21 first calculates the phase difference between the OFDM signal of a symbol L+1 and the OFDM signal of the immediately preceding symbol L regarding each subcarrier. If the offset amount detection range is from −MaxFreqOff to MaxFreqOff−1 as shown in FIG. 4, the carrier frequency offset detector 21 sets initially −MaxFreqOff as the assumed offset amount "k." The carrier frequency offset detector 21 finds the phase difference of the assumed CP subcarrier having the assumed offset amount "k," maps the phase difference for conversion into a vector, and accumulates that vector for one symbol. The absolute value of the accumulated value is acquired as the correlation value.

The carrier frequency offset detector 21 then sets −MaxFreqOff+1 as the assumed offset amount "k." The correlation value regarding the assumed offset amount "k" is then acquired similarly. In like manner, the assumed offset amount "k" is set to an integer ranging from −MaxFreqOff+2 to MaxFreqOff−1 in ascending order. The correlation value is then obtained regarding the assumed offset value "k."

When the offset amount for each of all subcarriers within the offset amount detection range is set to the assumed offset amount "k" and the correlation value of the assumed offset amount is obtained, the assumed offset amount "k" corresponding to the maximum correlation value is detected. In the example of FIG. 4, the actual offset amount per subcarrier is 2, so that the correlation value in effect when the assumed offset amount "k" is 2 becomes the maximum value. The assumed offset amount of 2 is then detected.

First Embodiment

Typical Structure of the OFDM Receiving Apparatus as the First Embodiment

Figure 5:
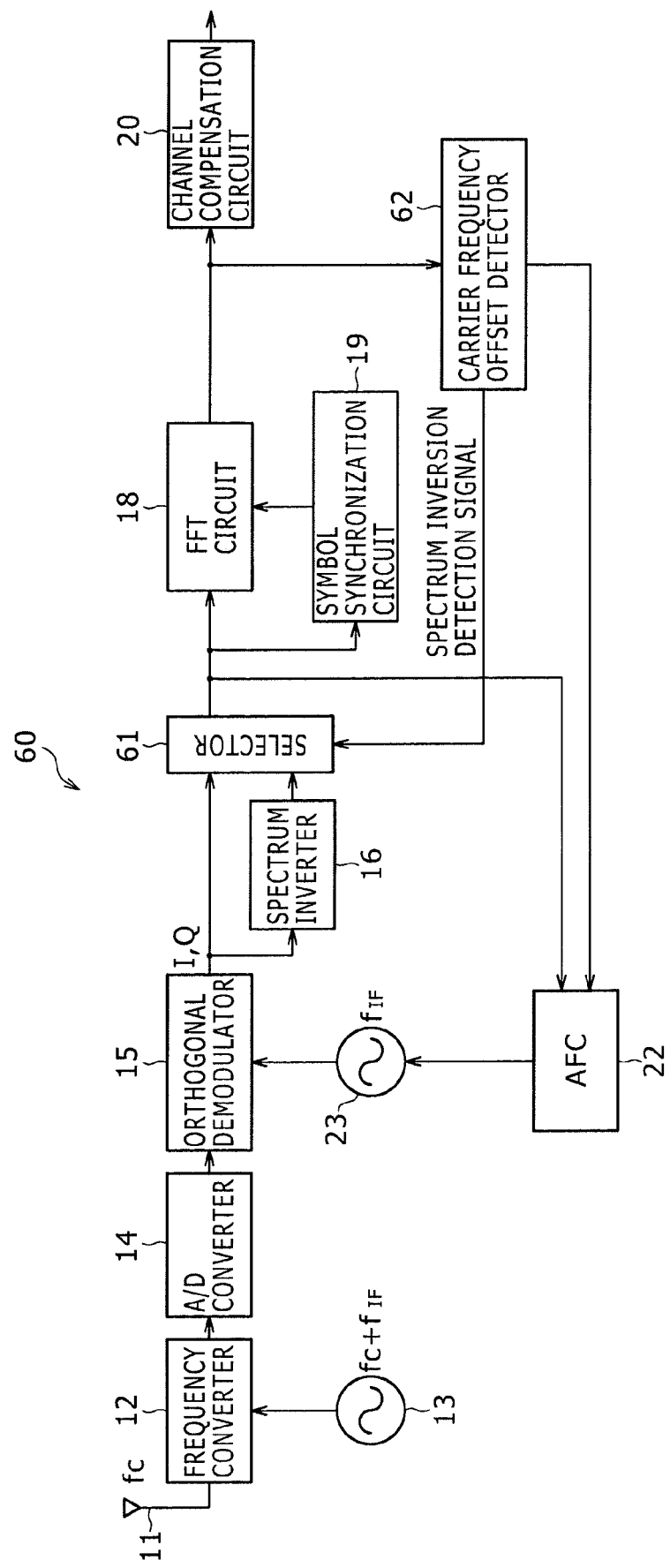
FIG. 5 is a block diagram showing a typical structure of an OFDM receiving apparatus practiced as a first embodiment of the present invention.

FIG. 5 is a block diagram showing a typical structure of an OFDM receiving apparatus practiced as the first embodiment of the present invention.

Of the components of the apparatus indicated in FIG. 5, those with their equivalents shown in FIG. 2 are designated by like reference numerals, and their descriptions are omitted hereunder where redundant.

The OFDM receiving apparatus 60 in FIG. 5 differs structurally from its counterpart in FIG. 2 mainly in that the selector 17 and carrier frequency offset detector 21 of the latter are replaced by a selector 61 and a carrier frequency offset detector 62, respectively. The OFDM receiving apparatus 60 detects whether spectrum inversion has occurred using the OFDM signal, and controls spectrum inversion accordingly.

Specifically, in the OFDM receiving apparatus 60, the carrier frequency offset detector 62 supplies the selector 61 with a spectrum inversion detection signal indicative of whether spectrum inversion has occurred in the frequency converter 12. In accordance with the spectrum inversion detection signal, the selector 61 selects either the I signal and Q signal from the orthogonal demodulator 15 or the I signal and Q signal from the spectrum inverter 16, and outputs the selected signals to the FFT circuit 18 and symbol synchronization circuit 19.

Using the OFDM signal fed from the FFT circuit 18, the carrier frequency offset detector 62 detects the offset amount per subcarrier and detects whether spectrum inversion has occurred in the frequency converter 12. As with the carrier frequency offset detector 21, the carrier frequency offset detector 62 feeds back the detected offset amount per subcarrier to the AFC 22. Also, the carrier frequency offset detector 62 supplies the selector 61 with a spectrum inversion detection signal indicative of the result of the detection.

[Detailed Typical Structure of the Carrier Frequency Offset Detector]

Figure 6:
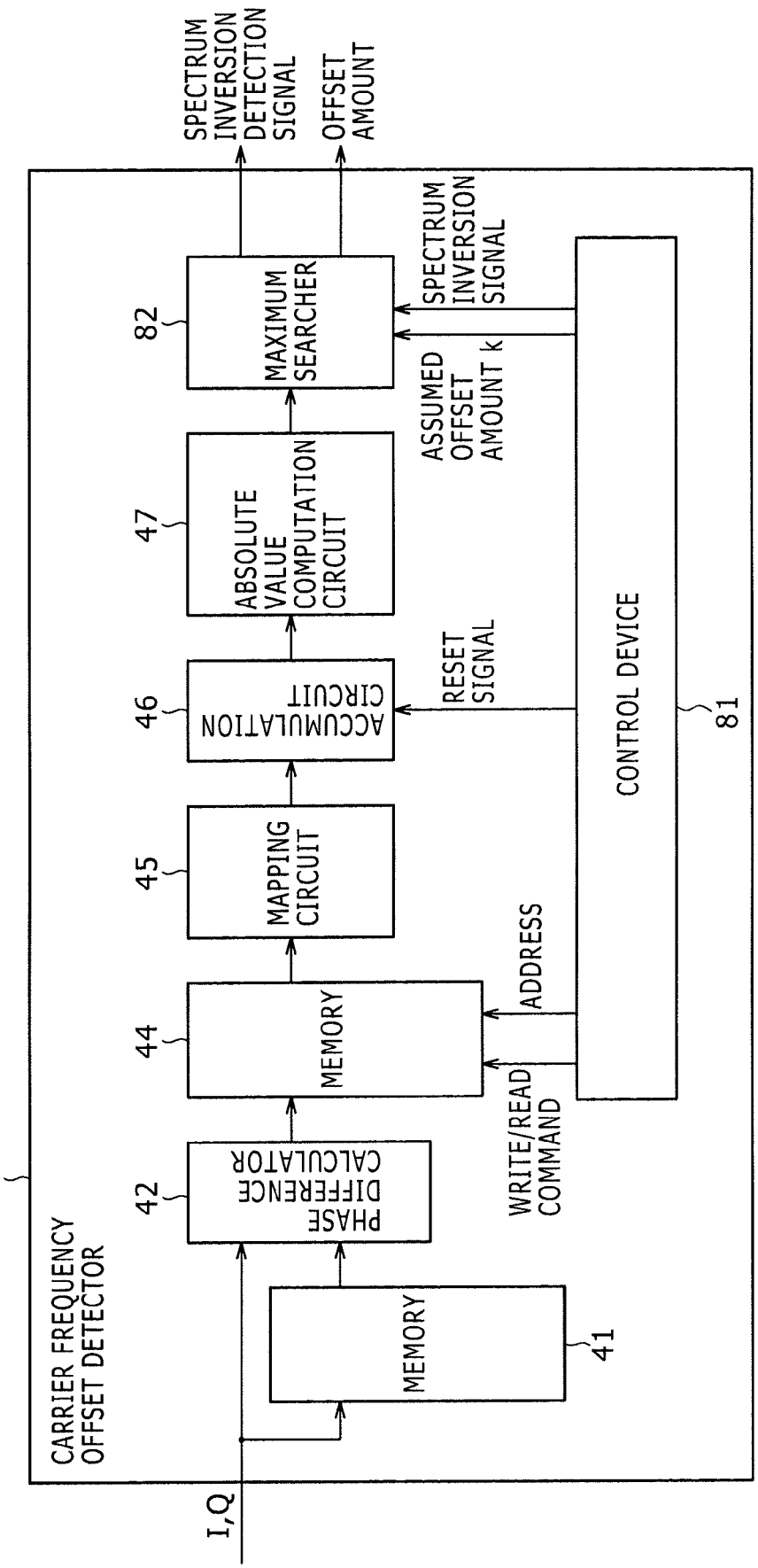
FIG. 6 is a block diagram showing a typical detailed structure of a carrier frequency offset detector included in FIG. 5.

FIG. 6 is a block diagram showing a typical detailed structure of the carrier frequency offset detector 62 included in FIG. 5.

Of the components indicated in FIG. 6, those with their counterparts shown in FIG. 3 are designated by like reference numerals, and their description are omitted hereunder where redundant.

The carrier frequency offset detector 62 in FIG. 6 differs structurally from its counterpart in FIG. 3 mainly in that the control device 43 and maximum searcher 48 of the latter are replaced by a control device 81 and a maximum searcher 82, respectively.

As with the control device 43, the control device 81 sets successively the offset amount of each of the subcarriers within a predetermined offset amount detection range to the assumed offset amount "k." The control device 81 proceeds to supply the maximum searcher 82 with the assumed offset amount "k" and a spectrum signal indicative of whether spectrum inversion has occurred.

If the spectrum signal indicates that spectrum inversion has not occurred, then the control device 81 determines the address of the phase difference of the assumed CP subcarrier as the read address based on the assumed offset amount "k" and on a set of the previously held subcarrier numbers of known CP subcarriers. In the ensuing description, the set of the subcarrier numbers of the known CP subcarriers will be called the set A. That is, the set A is a set of the subcarrier numbers of the subcarriers corresponding to the spectrum inversion absence signal which is an OFDM signal representing the subcarrier position of the CP signal included in the OFDM-modulated signal.

Furthermore, if the spectrum signal indicates that spectrum inversion has occurred, then the control device 81 determines the address of the phase difference of an inverted assumed CP subcarrier (to be described later in detail) as the read address based on the assumed offset amount "k" and on a previously held set B (to be discussed later in detail). Specifically, as the subcarrier number of the inverted assumed CP subcarrier, the control device 81 acquires the subcarrier number by shifting the subcarrier numbers within the set B by the assumed offset amount "k." The control device 81 then determines the read address based on the subcarrier number of the inverted assumed CP subcarrier.

Incidentally, the inverted assumed CP subcarrier is a subcarrier on which the CP signal is placed in the OFDM signal where spectrum inversion has occurred, provided that the actual offset amount per subcarrier is the assumed offset amount "k."

The set B is a set of the subcarrier numbers of known CP subcarriers in the OFDM signal where spectrum inversion has occurred. That is, the set B is a set of the subcarrier numbers of the subcarriers corresponding to the spectrum inversion presence signal which is an OFDM signal obtained by inverting the subcarrier position of the CP signal included in the OFDM-modulated signal. Specifically, the set B is a set of the subcarrier numbers of the known CP subcarriers corresponding to the subcarrier numbers in the set A and of the subcarrier numbers of the subcarriers symmetrically positioned on the frequency axis across the center subcarrier.

More specifically, in 8K mode under the DVB-T standard, the number of all subcarriers of the OFDM signal is 6817. Thus if the set A contains 0, 48, 54, 87, 141, 156, etc., then the set B is constituted by (6816-0), (6816-48), (6816-54), (6816-87), (6816-141), (6816-156), etc.

As with the control device 43, the control device 81 feeds the predetermined read address and the read command to the memory 44. Also like the control device 43, the control device 81 supplies the reset signal to the accumulation circuit 46 every time the accumulation circuit 46 completes the accumulation of the phase differences of the assumed CP subcarrier per symbol. And as with the control device 43, the control device 81 supplies the write command and the write address to the memory 44.

The maximum searcher 82 retains a table that associates the correlation values fed from the absolute value computation circuit 47 with the assumed offset value "k" from the control device 43 and a spectrum inversion signal. As with the maximum search 48 in FIG. 3, the maximum searcher 48 in FIG. 6 supplies the assumed offset value "k" corresponding to the maximum correlation value written in the table regarding one symbol, to the AFC 22 as the offset amount per subcarrier.

If the spectrum inversion signal corresponding to the maximum correlation value indicates the absence of spectrum inversion, the maximum searcher 82 supplies the selector 61 with a spectrum inversion detection signal indicative of the absence of spectrum inversion. On the other hand, if the spectrum inversion signal corresponding to the maximum correlation value indicates the presence of spectrum inversion, then the maximum searcher 82 supplies the selector 61 with a spectrum inversion detection signal indicating the presence of spectrum inversion. Illustratively, the spectrum inversion detection signal indicating the absence of spectrum inversion may be "0" and the spectrum inversion detection signal denoting the presence of spectrum inversion may be "1."

[Processing by the OFDM Receiving Apparatus]

Figure 7:
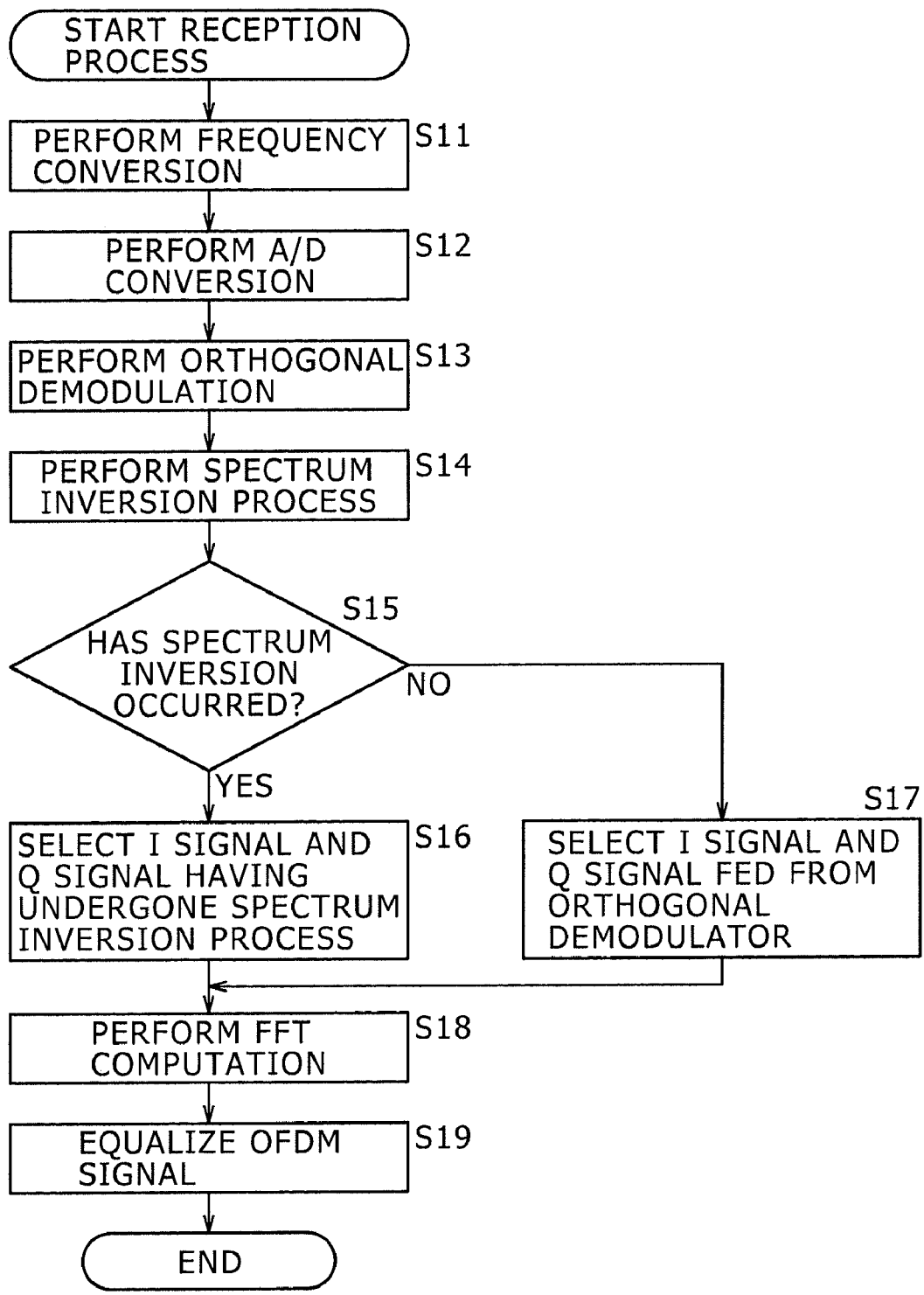
FIG. 7 is a flowchart explanatory of a reception process performed by the OFDM receiving apparatus of FIG. 5.

FIG. 7 is a flowchart explanatory of a reception process performed by the OFDM receiving apparatus 60. The reception process is started when an RF signal is received by the antenna 11.

In step S11 of FIG. 7, the frequency converter 12 multiplies the RF signal received by the antenna 11, by the carrier having the oscillatory frequency ($f_c+f_{IF}$) fed from the local oscillator 13, thereby frequency-converting the RF signal into an IF signal having the center frequency $f_{IF}$. The frequency converter 12 supplies the IF signal to the A/D converter 14.

In step S12, the A/D converter 14 converts the IF signal coming from the frequency converter 12 from analog to digital form. The digitized IF signal is sent to the orthogonal demodulator 15.

In step S13, the orthogonal demodulator 15 orthogonally demodulates the IF signal fed from the A/D converter 14 using the carrier supplied from the local oscillator 23. The orthogonal demodulator 15 feeds the I signal and Q signal acquired through orthogonal demodulation to the spectrum inverter 16 and selector 61.

In step S14, the spectrum inverter 16 performs a spectrum inversion process on the I signal and Q signal fed from the orthogonal demodulator 15. The spectrum inverter 16 supplies the spectrum-inverted I signal and Q signal to the selector 61.

In step S15, the selector 61 determines whether spectrum inversion has occurred in the frequency converter 12 based on the spectrum inversion detection signal fed from the carrier frequency offset detector 62. If the spectrum inversion detection signal indicates the presence of spectrum inversion, the selector 61 recognizes that spectrum inversion has taken place and passes control to step S16.

In step S16, the selector 61 selects the spectrum-inverted I signal and Q signal coming from the spectrum inverter 16, and outputs the selected signals to the FFT circuit 18, symbol synchronization circuit 19, and AFC 22. Control is then passed on to step S18.

If the spectrum inversion detection signal indicates the absence of spectrum inversion, the selector 61 recognizes in step S15 that spectrum inversion has not occurred and passes control to step S17.

In step S17, the selector 61 selects the I signal and Q signal fed from the orthogonal demodulator 15, and outputs the selected signals to the FFT circuit 18, symbol synchronization circuit 19, and AFC 22. Control is then passed on to step S18.

In step S18, the FFT circuit 18 performs FFT computation on the I signal and Q signal from the selector 61 in accordance with a symbol synchronization signal supplied from the symbol synchronization circuit 19. The FFT circuit 18 proceeds to supply the OFDM signal obtained through FFT computation to the channel compensation circuit 20 and carrier frequency offset detector 62.

In step S19, the channel compensation circuit 20 equalizes the OFDM signal fed from the FFT circuit 18, and outputs the equalized OFDM signal as the result of the demodulation. This brings the reception process to an end.

Figure 8:
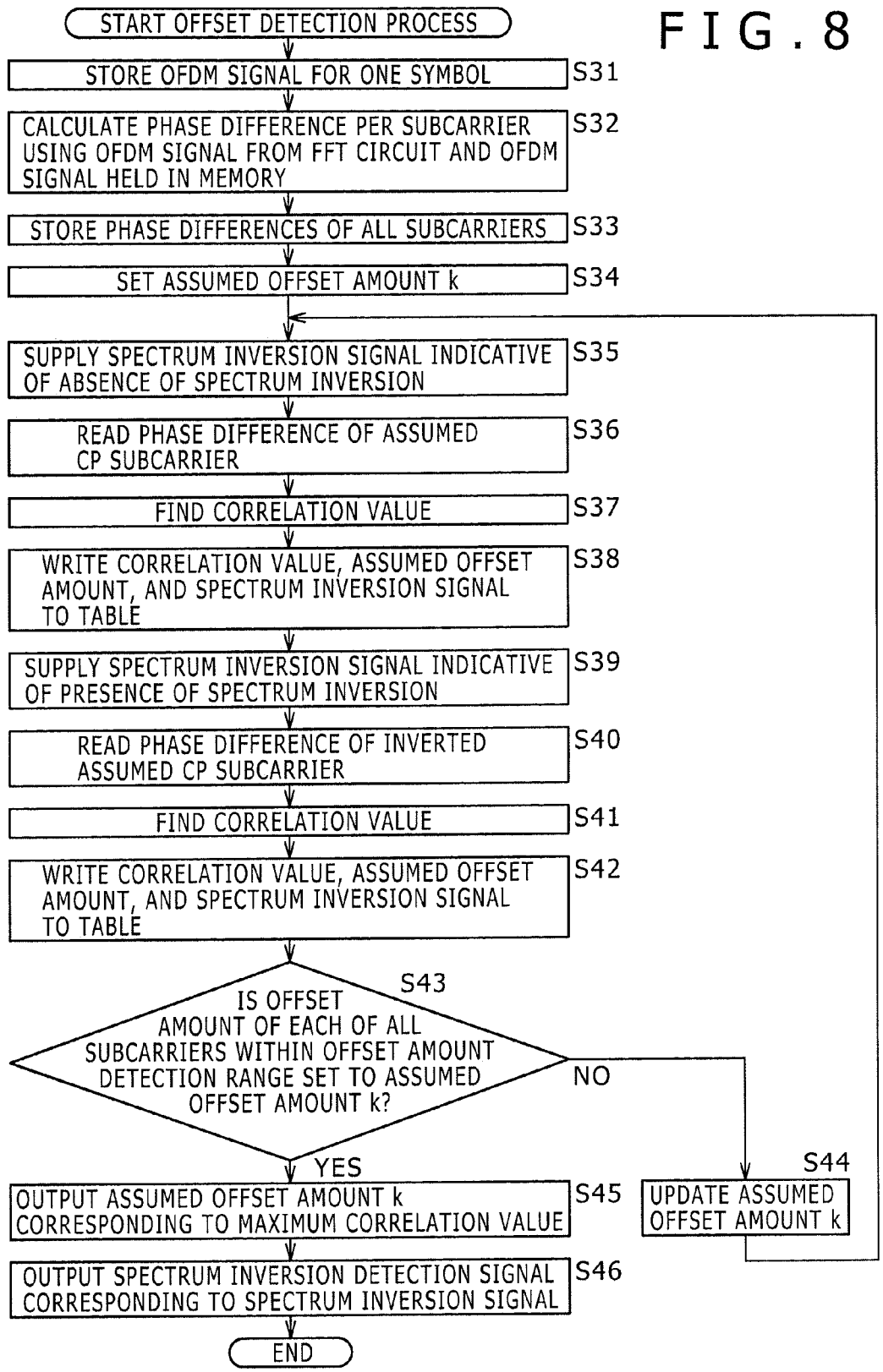
FIG. 8 is a flowchart explanatory of an offset detection process performed by the carrier frequency offset detector of FIG. 6.

FIG. 8 is a flowchart explanatory of an offset detection process performed by the carrier frequency offset detector 62 of the OFDM receiving apparatus 60. The offset detection process is started when the FFT circuit 18 supplies the OFDM signal to the carrier frequency offset detector 62.

In step S31 of FIG. 8, the memory 41 of the carrier frequency offset detector 62 stores the OFDM signal for one symbol supplied from the FFT circuit 18. In step S32, the phase difference calculator 42 calculates the phase difference per subcarrier using the OFDM signal for one symbol coming from the FFT circuit 18 as well as the OFDM signal of the immediately preceding symbol stored in the memory 41. The phase difference calculator 42 supplies the calculated phase differences of all subcarriers to the memory 44.

In step S33, the memory 44 stores the phase differences of all subcarriers fed from the phase difference calculator 42 on the basis of the write command and write address coming from the control device 81.

In step S34, the control device 81 sets to the assumed offset amount "k" the offset amount yet to be set as the assumed offset amount "k" from among the subcarrier-by-subcarrier offset amounts within a predetermined offset amount detection range. The control device 81 feeds the assumed offset amount "k" to the maximum searcher 82.

In step S35, the control device 81 supplies the maximum searcher 82 with the spectrum inversion signal indicating the absence of spectrum inversion. Also, based on the assumed offset amount "k" and the set A, the control device 81 determines the address of the phase difference regarding the assumed CP subcarrier as the read address, and sends the read address and the read command to the memory 44.

In step S36, the memory 44 reads out the phase difference of the assumed CP subcarrier based on the read command and read address coming from the control device 81.

In step S37, the carrier frequency offset detector 62 acquires the correlation value using the phase difference of the assumed CP subcarrier retrieved from the memory 44.

Specifically, the mapping circuit 45 maps the phase difference of the assumed CP subcarrier read from the memory 44 onto a circumference with a fixed radius on a complex plane for conversion into a vector. Using its internal memory, the accumulation circuit 46 accumulates the vector for one symbol following the conversion by the mapping circuit 45 in accordance with the reset signal coming from the control device 81. The accumulation circuit 46 supplies the result of the accumulation of the vector for one symbol to the absolute value computation circuit 47, and resets the internal memory. The absolute value computation circuit 47 acquires the absolute value of the vector fed from the accumulation circuit 46, and regards the absolute value thus obtained as the correlation value. The correlation value thus acquired is sent to the maximum searcher 82.

In step S38, the maximum searcher 82 writes to a table the correlation value coming from the absolute value computation circuit 47 in association with the assumed offset amount "k" and spectrum inversion signal fed from the control device 43.

In step S39, the control device 81 sends the spectrum inversion signal indicating the presence of spectrum inversion to the maximum searcher 82. And based on the assumed offset amount "k" and the set B, the control device 81 determines the address of the phase difference of the inverted assumed CP subcarrier as the read address, and supplies the read address and the read command to the memory 44.

In step S40, the memory 44 reads out the phase difference of the inverted assumed CP subcarrier on the basis of the read command and read address coming from the control device 81.

In step S41, the carrier frequency offset detector 62 obtains the correlation value using the phase difference of the inverted assumed CP subcarrier retrieved from the memory 44.

In step S42, the maximum searcher 82 writes to the table the correlation value fed from the absolute value computation circuit 47 in association with the assumed offset amount "k" and spectrum inversion signal supplied from the control device 43.

In step S43, the control device 81 determines whether the offset amount for each of all subcarriers within the offset amount detection range is set to the assumed offset amount "k." If in step S43 the offset amount for each of all subcarriers within the offset amount detection range is not found to be set to the assumed offset amount "k" yet, then control is passed on to step S44.

In step S44, the control device 81 updates the assumed offset amount "k" to an offset amount yet to be set to the assumed offset amount "k" from among the subcarrier-by-subcarrier offset amounts within the offset amount detection range. Control is then returned to step S36. Steps S36 through S44 are repeated until the offset amount for each of all subcarriers within the offset amount detection range is set to the assumed offset amount "k."

If in step S43 the offset amount for each of all subcarriers within the offset amount detection range is found to have been set to the assumed offset amount "k," then control is passed on to step S45. In step S45, the maximum searcher 82 outputs the assumed offset amount "k" corresponding to the maximum correlation value written in the table, to the AFC 22 as the offset amount per subcarrier.

In step S46, the maximum searcher 82 outputs to the selector 61 the spectrum inversion detection signal corresponding to the spectrum inversion signal associated with the maximum correlation value written in the table. This brings the offset detection process to an end.

Second Embodiment

Typical Structure of the OFDM Receiving Apparatus as the Second Embodiment

Figure 9:
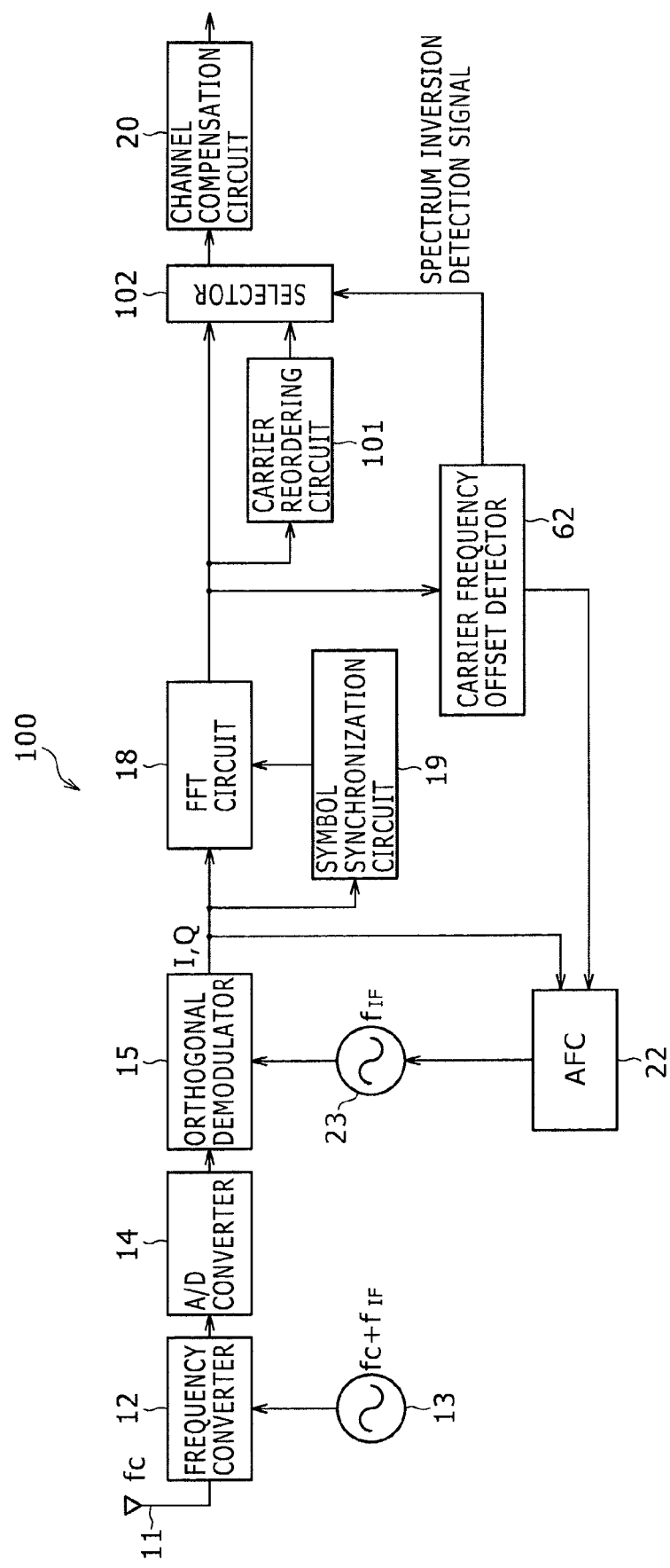
FIG. 9 is a block diagram showing a typical structure of an OFDM receiving apparatus practiced as a second embodiment of the present invention.

FIG. 9 is a block diagram showing a typical structure of an OFDM receiving apparatus 100 practiced as the second embodiment of the present invention.

Of the components of the apparatus indicated in FIG. 9, those with their counterparts shown in FIG. 5 are designated by like reference numerals, and their descriptions are omitted hereunder where appropriate.

The OFDM receiving apparatus 100 in FIG. 9 differs structurally from its counterpart in FIG. 5 mainly in that the spectrum inverter 16 and selector 61 of the latter are replaced by a carrier reordering circuit 101 and a selector 102, respectively. The OFDM receiving apparatus 100 has a spectrum inversion process according to the spectrum inversion detection signal performed on the OFDM signal having undergone FFT computation.

Specifically, in the OFDM receiving apparatus 100, the I signal and Q signal output from the orthogonal demodulator 15 are input unmodified to the FFT circuit 18 alone. The OFDM signal derived from FFT computation by the FFT circuit 18 is supplied to the carrier frequency offset detector 62, carrier reordering circuit 101, and selector 102.

The carrier reordering circuit 101 performs the spectrum inversion process on the OFDM signal fed from the FFT circuit 18. More specifically, the carrier reordering circuit 101 substitutes the signal of each subcarrier of the OFDM signal for the signal of the subcarrier symmetrically positioned relative to the subcarrier in question across the center subcarrier on the frequency axis.

For example, the carrier reordering circuit 101 switches the signal of subcarrier number 0 with the signal of subcarrier number 6816, the signal of subcarrier number 1 with the signal of subcarrier number 6815, the signal of subcarrier number 2 with the signal of subcarrier number 6814, the signal of subcarrier number 3 with the signal of subcarrier number 6813, . . . , and the signal of subcarrier number 3406 with the signal of subcarrier number 3410. The carrier reordering circuit 101 also switches the signal of subcarrier number 3407 with the signal of subcarrier number 3409, and leaves the signal of subcarrier number 3408 intact.

The carrier reordering circuit 101 proceeds to send the spectrum-inverted OFDM signal to the selector 102.

In accordance with the spectrum inversion detection signal fed from the carrier frequency offset detector 62, the selector 102 selects either the OFDM signal from the FFT circuit 18 or the OFDM signal from the carrier reordering circuit 101, and outputs the selected signal to the channel compensation circuit 20.

[Processing by the OFDM Receiving Apparatus]

Figure 10:
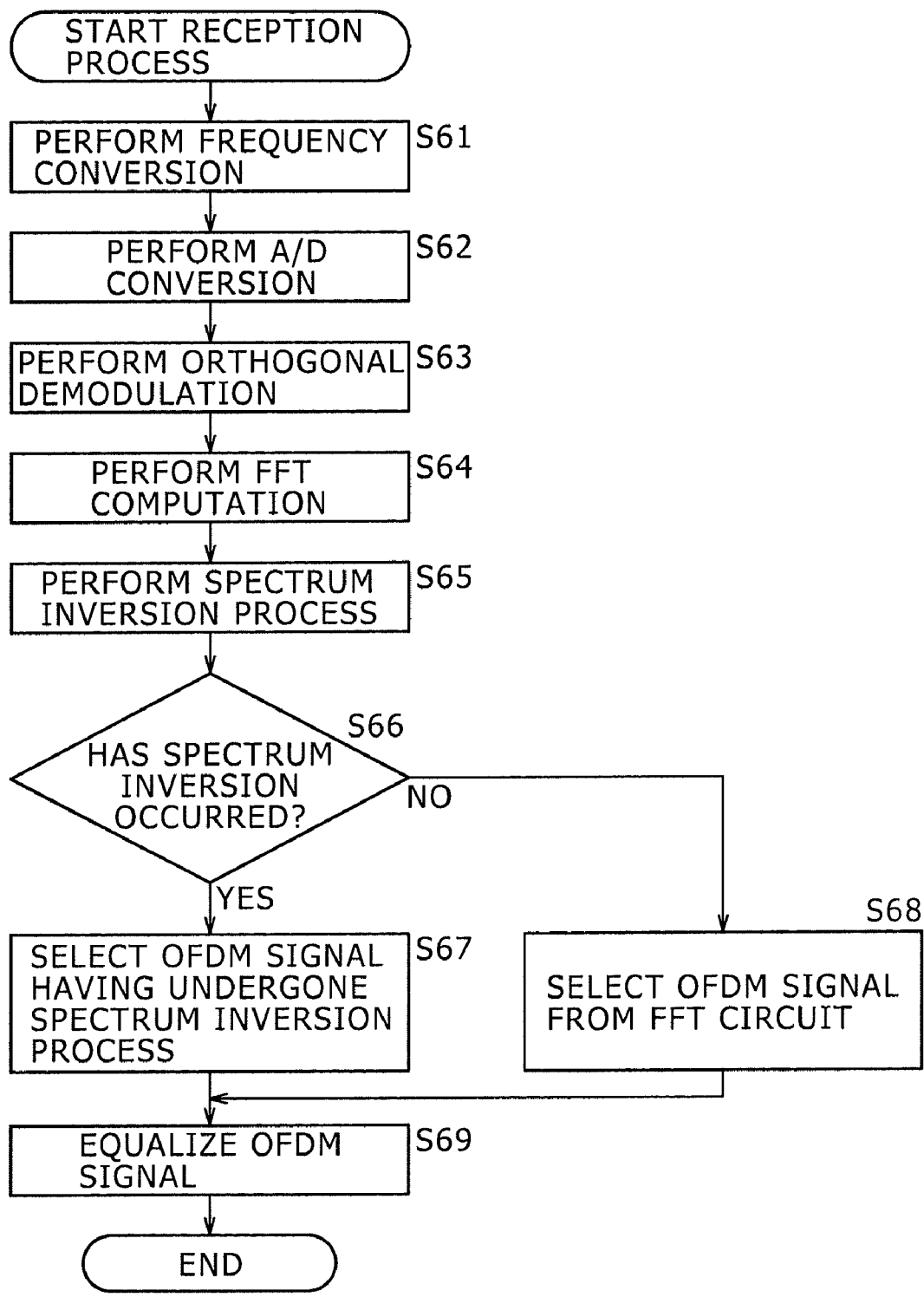
FIG. 10 is a flowchart explanatory of a reception process performed by the OFDM receiving apparatus of FIG. 9.

FIG. 10 is a flowchart explanatory of a reception process performed by the OFDM receiving apparatus 100. The reception process is started when the RF signal is received by the antenna 11.

Steps S61 through S63 in FIG. 10 are the same as steps S11 through S13 in FIG. 7 discussed above, and thus will not be described further.

In step S64 following step S63, the FFT circuit 18 performs FFT computation on the I signal and Q signal fed from the orthogonal demodulator 15 in accordance with the symbol synchronization signal supplied from the symbol synchronization circuit 19. The FFT circuit 18 sends the OFDM signal obtained through FFT computation to the carrier frequency offset detector 62, carrier reordering circuit 101, and selector 102.

In step S65, the carrier reordering circuit 101 performs a spectrum inversion process on the OFDM signal fed from the FFT circuit 18. The carrier reordering circuit 101 sends the spectrum-inverted OFDM signal to the selector 102.

In step S66, the selector 102 determines whether spectrum inversion has occurred in the frequency converter 12 based on the spectrum inversion detection signal supplied from the carrier frequency offset detector 62. If the spectrum inversion detection signal indicates the presence of spectrum inversion, the selector 102 determines that spectrum inversion has taken place, and passes controls to step S67.

In step S67, the selector 102 selects the spectrum-inverted OFDM signal coming from the carrier reordering circuit 101, and outputs the selected signal to the channel compensation circuit 20. Control is then passed on to step S69.

If the spectrum inversion detection signal denotes the absence of spectrum inversion, the selector 102 in step S66 determines that spectrum inversion has not occurred, and passes control to step S68.

In step S68, the selector 102 selects the OFDM signal supplied from the FFT circuit 18, and outputs the selected signal to the channel compensation circuit 20. Control is then passed on to step S69.

In step S69, the channel compensation circuit 20 equalizes the OFDM signal fed from the selector 102, and outputs the equalized OFDM signal as the result of the modulation. This brings the reception process to an end.

In the foregoing description, the spectrum inversion detection signal was shown to be switched in keeping with the spectrum inversion signal corresponding to the maximum correlation value. Alternatively, the spectrum inversion detection signal may be switched by the following method:

That is, the spectrum inversion detection signal may be switched depending on whether the maximum correlation value of the inverted assumed CP subcarrier corresponding to the spectrum detection signal indicating the presence of spectrum inversion is in excess of a predetermined value. In this case, if the maximum correlation value of the inverted assumed CP subcarrier is found to be the predetermined value or larger, the spectrum inversion detection signal indicating the presence of spectrum inversion is output; if the maximum correlation value of the inverted assumed CP subcarrier is found to be smaller than the predetermined value, then the spectrum inversion detection signal denoting the absence of spectrum inversion is output.

In the foregoing description, the selector 61 or 102 was shown to be controlled in making the selection in accordance with the spectrum inversion detection signal. Alternatively, the spectrum inversion process may be directly controlled in keeping with the spectrum inversion detection signal. In this case, the OFDM receiving apparatus 60 (100) is not furnished with the selector 61 (102), and the spectrum inversion detection signal is input to the spectrum inverter 16 (or to the carrier reordering circuit 101). The spectrum inverter 16 (or the carrier reordering circuit 101) then controls whether or not to perform the spectrum inversion process in accordance with the spectrum inversion detection signal.

As described above, the OFDM receiving apparatus 60 or 100 detects whether or not spectrum inversion has occurred using the spectrum inversion presence signal in such a manner that the occurrence of spectrum inversion in the OFDM-modulated signal can be detected automatically. Unlike the ordinary OFDM receiving apparatus 10, the OFDM receiving apparatus 60 or 100 need not to have the selection signal established beforehand.

Incidentally, the series of the processes described above may be executed either by hardware or by software. In terms of hardware, at least part of the above-described OFDM receiving apparatus may be implemented illustratively by use of a personal computer shown in FIG. 11.

In FIG. 11, a CPU (central processing unit) 201 performs various processes in accordance with the programs recorded in a ROM (read only memory) 202 or loaded into a RAM (random access memory) 203 from a storage device 208. The RAM 203 may also retain data needed by the CPU 201 in carrying out the diverse processing.

The CPU 201, ROM 202, and RAM 203 are interconnected via a bus 204. An input/output interface 205 is also connected to the bus 204.

The input/output interface 205 is connected with an input device 206 typically made up of a keyboard and a mouse, an output device 207 such as a display, the storage device 208 composed illustratively of a hard disk, and a communication device 209 constituted generally by a modem and/or a terminal adapter. The communication device 209 controls communications conducted with other apparatuses (not shown) via networks including the Internet.

A drive 210 may be connected as needed to the input/output interface 205. A piece of removable media 211 such as magnetic disks, optical disks, magneto-optical disks, and semiconductor memories may be loaded into the drive 210. Computer programs retrieved from the loaded removable medium may be installed as needed into the storage device 208.

Where the processes discussed above are to be carried out by software, the programs constituting the software may be either incorporated beforehand in the dedicated hardware of the computer to be used or installed over networks or from a suitable recording medium into a general-purpose personal computer or like equipment capable of executing diverse functions based on the installed programs.

As shown in FIG. 11, the program recording medium is offered to users not only as the removable media (package media) 211 apart from their apparatus and constituted by magnetic disks (including floppy disks), optical disks (including CD-ROM (compact disk-read only memory), DVD (digital versatile disk) and Blu-ray disks), magneto-optical disks (including MD (Mini-disk)), or semiconductor memories; but also in the form of the ROM 202 or the hard disk in the storage device 208, each accommodating the programs and incorporated beforehand in the users' apparatus.

The present invention may also be applied to the OFDM receiving apparatus for receiving OFDM-modulated signals complying with the ISDB-T standard. In this case, whether or not spectrum inversion has occurred is detected using not the CP signal but the phase difference of the subcarriers in which the TMCC (Transmission and Multiplexing Configuration Control) signal is assumed to be placed. Because the TMCC signal can take the values "1" and "−1," the correlation value is calculated by accumulating not vectors but squared vectors.

In this specification, the steps describing the programs recorded on the recording medium represent not only the processes that are to be carried out in the depicted sequence (i.e., on a time series basis) but also processes that may be performed parallelly or individually and not chronologically.

It should be noted that the present invention is not limited only to the above-described embodiments but various changes can be made without departing from the gist of the present invention.

The present application contains subject matter related to that disclosed in Japanese Priority Patent Application JP 2009-091963 filed in the Japan Patent Office on Apr. 6, 2009, the entire content of which is hereby incorporated by reference.

What is claimed is:

1. A receiving apparatus comprising:
reception means for receiving a signal modulated through Orthogonal Frequency Division Multiplexing known as OFDM;
detection means for detecting whether or not spectrum inversion has occurred in the OFDM-modulated signal by use of a spectrum inversion presence signal obtained by inverting a subcarrier position of a known signal included in said OFDM-modulated signal;
frequency conversion means for performing frequency conversion of said OFDM-modulated signal; and
spectrum inversion means for performing, if said detection means detects the presence of said spectrum inversion, a spectrum inversion process on said OFDM-modulated signal having undergone the frequency conversion.

2. The receiving apparatus according to claim 1, further comprising
setting means for setting successively an offset amount of each of predetermined subcarriers as an assumed offset amount, wherein said detection means detects whether or not said spectrum inversion has occurred using said spectrum inversion presence signal obtained by shifting by said assumed offset amount the subcarrier position of said known signal included in said OFDM-modulated signal before inverting said subcarrier position.

3. The receiving apparatus according to claim 1, wherein said detection means detects whether or not said spectrum inversion has occurred using said spectrum inversion presence signal and a spectrum inversion absence signal derived from said subcarrier position of said known signal included in said OFDM-modulated signal.

4. The receiving apparatus according to claim 3, wherein said detection means detects whether or not said spectrum inversion has occurred based on a correlation value between symbols of said spectrum inversion presence signal and on a correlation value between symbols of said spectrum inversion absence signal.

5. A receiving method for use with a receiving apparatus, said receiving method comprising the steps of:
receiving, via a reception means, a signal modulated through Orthogonal Frequency Division Multiplexing known as OFDM;
detecting, using a detection means, whether or not spectrum inversion has occurred in the OFDM-modulated signal by use of a spectrum inversion presence signal obtained by inverting a subcarrier position of a known signal included in said OFDM-modulated signal;
performing frequency conversion of said OFDM-modulated signal using a frequency conversion means; and
performing, if said detection means detects the presence of said spectrum inversion, a spectrum inversion process using a spectrum inversion means on said OFDM-modulated signal having undergone the frequency conversion.

6. A non-transitory computer-readable medium on which is recorded a program for causing a computer to execute a process comprising the steps of:
receiving, via a reception means, a signal modulated through Orthogonal Frequency Division Multiplexing known as OFDM;
detecting, using a detection means, whether or not spectrum inversion has occurred in the OFDM-modulated signal by use of a spectrum inversion presence signal obtained by inverting a subcarrier position of a known signal included in said OFDM-modulated signal;

performing frequency conversion of said OMNI-modulated signal using a frequency conversion means; and performing, if said detection means detects the presence of said spectrum inversion, a spectrum inversion process using a spectrum inversion means on said OFDM-modulated signal having undergone the frequency conversion.

7. A receiving apparatus comprising:

a reception device configured to receive a signal modulated through Orthogonal Frequency Division Multiplexing known as OFDM;

a detection device configured to detect whether or not spectrum inversion has occurred in the OFDM-modulated signal by use of a spectrum inversion presence signal obtained by inverting a subcarrier position of a known signal included in said OFDM-modulated signal;

frequency conversion device for performing frequency conversion of said OFDM-modulated signal; and spectrum inversion device for performing, if said detection device detects the presence of said spectrum inversion, a spectrum inversion process on said OFDM-modulated signal having undergone the frequency conversion.

* * * * *